United States Patent [19]
Aftanas et al.

[11] Patent Number: 5,975,391
[45] Date of Patent: Nov. 2, 1999

[54] MOUNTING MEMBER FOR A SLAT OF A VEHICLE ARTICLE CARRIER

[75] Inventors: Jeffrey M. Aftanas, Sterling Heights; Donald R. Potter, Clarkston, both of Mich.

[73] Assignee: JAC Products, Inc., Ann Arbor, Mich.

[21] Appl. No.: 09/065,843

[22] Filed: Apr. 22, 1998

[51] Int. Cl.[6] ................................................. B60R 9/04
[52] U.S. Cl. .......................... 224/309; 224/326; 224/327
[58] Field of Search .................................. 224/309, 325, 224/326, 327, 329, 330, 331, 321

[56] References Cited

U.S. PATENT DOCUMENTS

| | | |
|---|---|---|
| 4,723,696 | 2/1988 | Stichweh et al. . |
| 4,834,448 | 5/1989 | Sakamoto et al. ...................... 224/309 |
| 4,911,348 | 3/1990 | Rasor et al. . |
| 5,762,247 | 6/1998 | Cucheran et al. . |
| 5,782,392 | 7/1998 | Yamamoto .............................. 224/309 |

FOREIGN PATENT DOCUMENTS

| | | | |
|---|---|---|---|
| 4320762 | 1/1994 | Germany ................................ 224/331 |

*Primary Examiner*—Linda J. Sholl
*Attorney, Agent, or Firm*—Harness, Dickey & Pierce, PLC

[57] ABSTRACT

A mounting apparatus adapted to be disposed within a channel formed in an outer body surface of a vehicle, wherein the channel includes a permanently disposed hook portion, for securing a slat to the hook portion without the use of conventional riv-nut fasteners and without requiring holes to be drilled in the outer body surface. The apparatus comprises a mounting bracket having a base portion and a pair of offset arm portions. The base portion is adapted to slide under a lip of the permanently secured hook portion so as to be disposed substantially completely within the channel formed in the outer body surface of a vehicle. The arm portions include threaded openings which allow conventional fastening elements to be used to secure the slat to the mounting bracket. The mounting bracket can be used with or without a conventional resilient mounting pad. Since the mounting bracket does not require the drilling of any holes in the outer body surface, the risk of water entering into the interior area of the vehicle is significantly reduced. Furthermore, the securing of the slats to the outer body surfaces is significantly simplified since no holes must be marked and drilled in the outer body surface for attachment of the slats thereto.

20 Claims, 3 Drawing Sheets

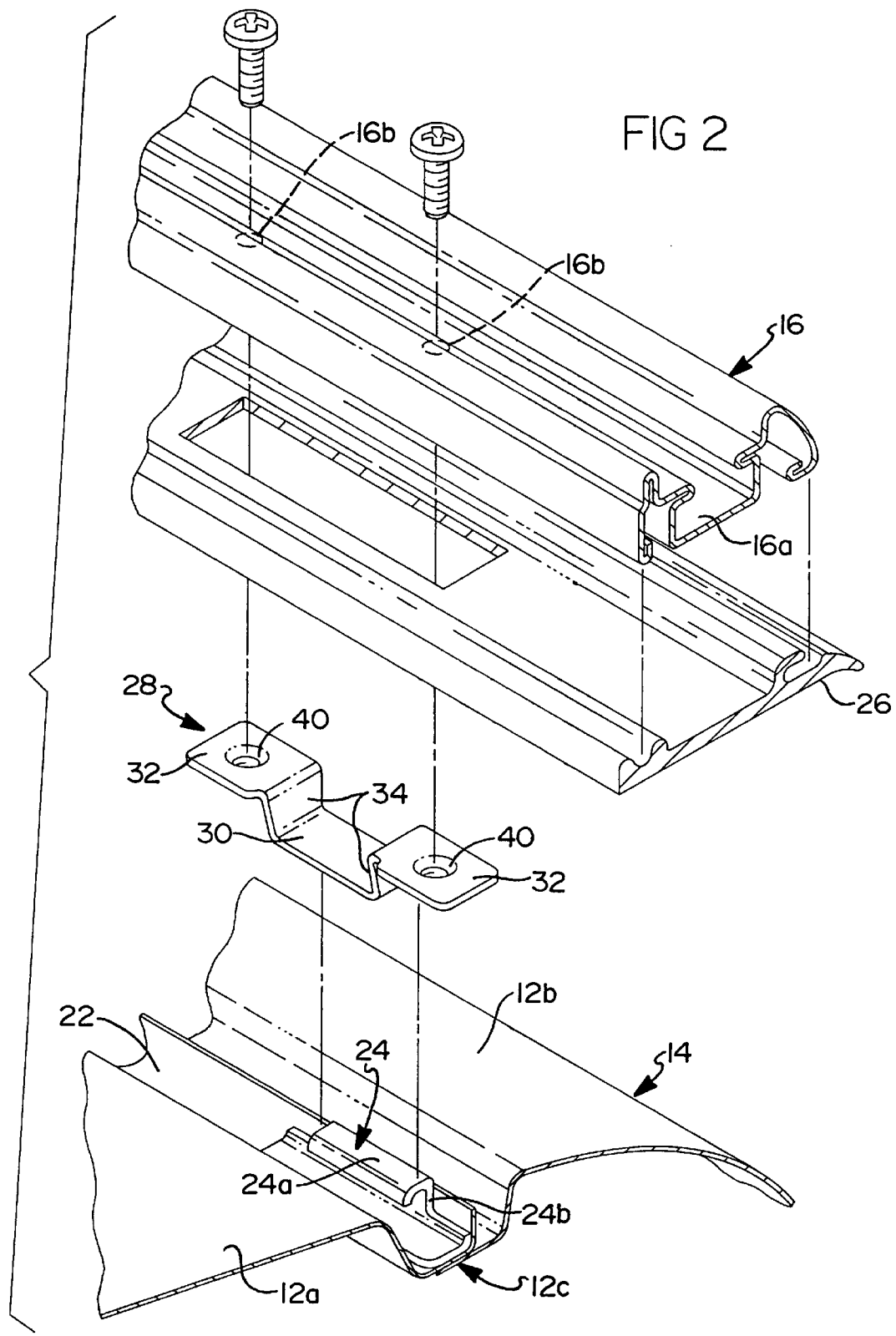

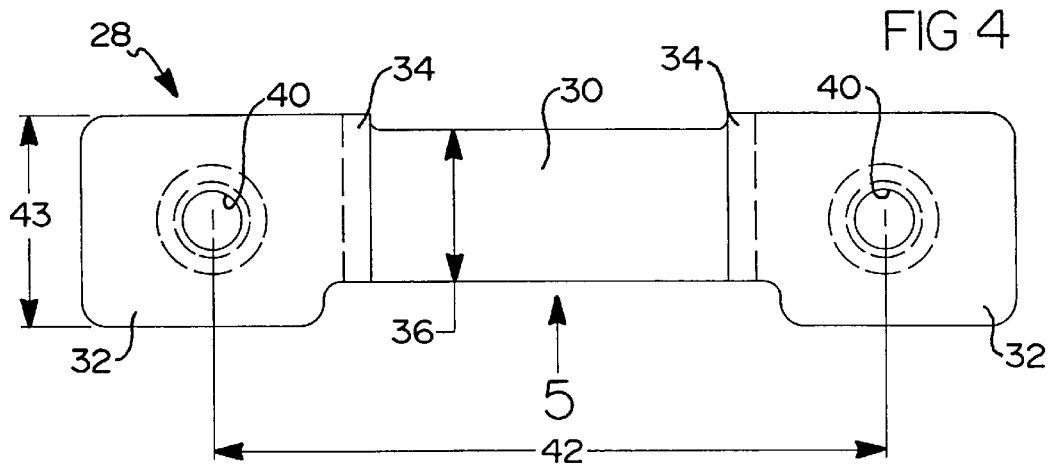
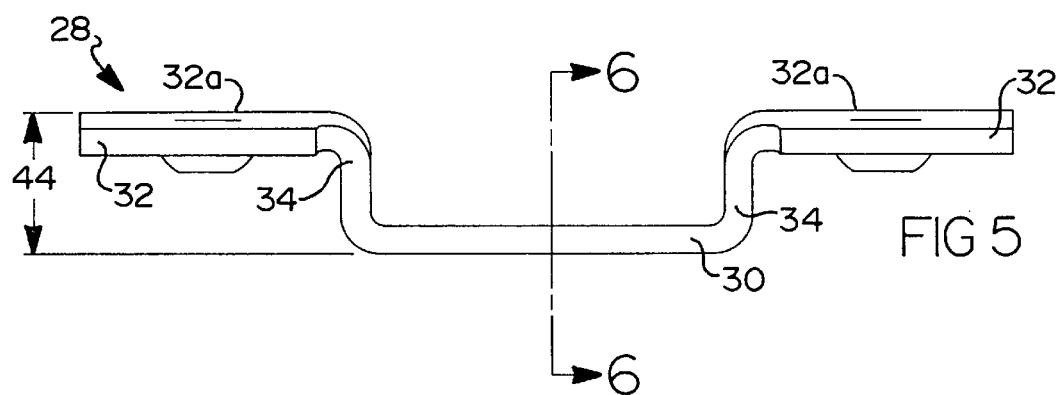
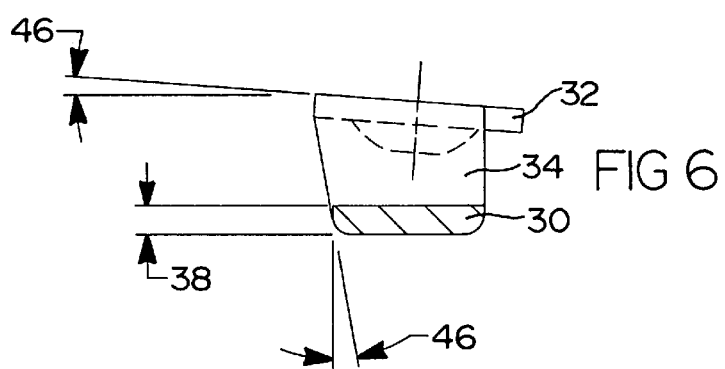

5,975,391

MOUNTING MEMBER FOR A SLAT OF A VEHICLE ARTICLE CARRIER

BACKGROUND OF THE INVENTION

1. Technical Field

This invention relates to vehicle article carriers, more particularly to a mounting apparatus for securing a slat of a vehicle article carrier to an outer body surface of a vehicle without the need to drill holes in the outer body surface and insert threaded fasteners through such holes.

2. Background

Vehicle article carriers are used in a wide variety of applications to secure various articles above an outer body surface of a vehicle such as a roof or deck wood of the vehicle. Many vehicle article carriers comprise a pair of slats which are mounted fixedly to the outer body surface of the vehicle. The slats are secured typically by fasteners known in the art as "riv-nut" fasteners. The rib nut fasteners are installed by first drilling holes in the outer body surface at a plurality of locations along the areas where the slats are to be secured. As will be appreciated, this is a labor intensive procedure and must be performed with precision to permit the holes to align with pre-formed openings in the slats which are being secured to the vehicle. Once the holes are drilled, the riv-nut fasteners are inserted therethrough. The slat is then positioned over the riv-nut fasteners and threaded fastening elements are used to secure these slat to the riv-nut fasteners. Thus, the use of riv-nut fasteners adds to the cost of the vehicle article carrier both in terms of adding more components to the vehicle article carrier and the labor necessary to install the slats on the vehicle.

In most vehicles, a channel exists where the metal roof panel is joined to the metal side panels by a plurality of spot welds. Some vehicle manufacturers have begun disposing hooks within these channels. The hooks are typically welded within the channels and form a very sturdy point of attachment. Also, since these channels are typically formed very close to the outer edges of the roof of the vehicle, these points of attachment are extremely structurally strong areas of the vehicle roof.

The above mentioned hooks have typically been used for securing pads designed to simply cover the channel to present a more aesthetically appealing surface. In some instances, these hooks have been used to mount brackets or other like elements. However, it is not believed that these hooks have heretofore been used in connection with any external devices or elements which enabled a slat of a vehicle article carrier to be secured to the outer body surface over the channel by attachment to the hook. This form of attachment would permit a slat to be secured to the outer body surface without the need for drilling holes and installing riv-nut fasteners in the outer body surface, and therefore significantly simplify and reduce the cost of installing the slats of a vehicle article carrier on the vehicle. Such a means of attachment would also increase the strength by which the slats are secured to the vehicle since the slats would be secured at a structurally strong point on the vehicle roof.

In view of the foregoing, it is the principal object of the present invention to provide a means by which a conventional slat may be secured to an existing hook disposed within a channel of an outer body surface of a vehicle so as to obviate the need for riv-nuts and for drilling holes in the outer body surface.

It is a further object of the present invention to provide an apparatus for mounting a slat to an existing hook disposed within a channel of an outer body surface of a vehicle, where the apparatus may be secured to the hook without any external fastening elements or any fastening procedures such as welding.

It is a further object of the present invention to provide an apparatus which forms a low cost, simple to manufacture means for attaching a conventional slat of a vehicle article carrier to an existing hook disposed within a channel in an outer body surface of the vehicle.

It is still another object of the present invention to provide a mounting apparatus which permits a conventional slat to be attached to an outer body surface of a vehicle in a manner such that the apparatus is concealed substantially entirely within a channel formed in the outer body surface of the vehicle so as to maintain a low profile of said slat on the outer body surface.

SUMMARY OF THE INVENTION

The above and other objects are provided by a mounting apparatus in accordance with the preferred embodiments of the present invention. The mounting apparatus generally includes a base portion and a pair of arm portions extending from opposite sides of the base portion. The arm portions are laterally offset from the base portion by a pair of connecting portions. The thickness of the base portion is such that it is able to be slid underneath a lip of a hook portion permanently installed in a channel formed in an outer body surface of a vehicle. The connecting portions are further spaced apart a distance just slightly larger than the width of the lip of the hook portion such that the apparatus is not able to slide longitudinally within the channel. In a preferred embodiment, the connecting portions are laterally offset a distance which places an upper surface of each approximately at, and more preferably slightly above, an outer body surface of the vehicle.

The connecting portions include openings which allow conventional threaded fasteners to be used to secure the slats to the arm portions. When so secured, the slat is clamped securely to the outer body surface by the external threaded fasteners. Advantageously, the mounting apparatus requires no threaded fasteners, welding or any other means of attachment to the existing hook portion disposed within the channel. Also, securing the slats to these portions of the outer body surface provides an extremely structurally strong connection of the slat to the outer body surface.

The apparatus of the present invention also allows conventional slats of a vehicle article carrier to be installed to the outer body surface without requiring any holes to be drilled whatsoever in the outer body surface. This saves significantly on labor, as well as materials cost since no riv-nut fasteners need to be installed in the outer body surface prior to installing the slat. The apparatus of the present invention also removes the possibility of one or more holes being drilled in positions where they may not align perfectly with the openings formed in the slat. Still further, the apparatus, by not requiring any holes to be drilled in the roof of the vehicle, even further reduces the possibility of any water leaking through these openings into the interior area of the vehicle.

BRIEF DESCRIPTION OF THE DRAWINGS

FIG. 2 is a cross sectional view of a portion of the outer body surface of the vehicle showing the slat and a portion of the outer body surface in cross section in accordance with section line 2—2 in FIG. 1;

FIG. 4 is a plane view of the mounting apparatus;

FIG. 5 is a front view of the apparatus in accordance with directional arrow 5 in FIG. 4;

FIG. 6 is a cross sectional view of the mounting apparatus taken in accordance with section line 6—6 in FIG. 5.

DETAILED DESCRIPTION OF THE PREFERRED EMBODIMENTS

Figure 1:
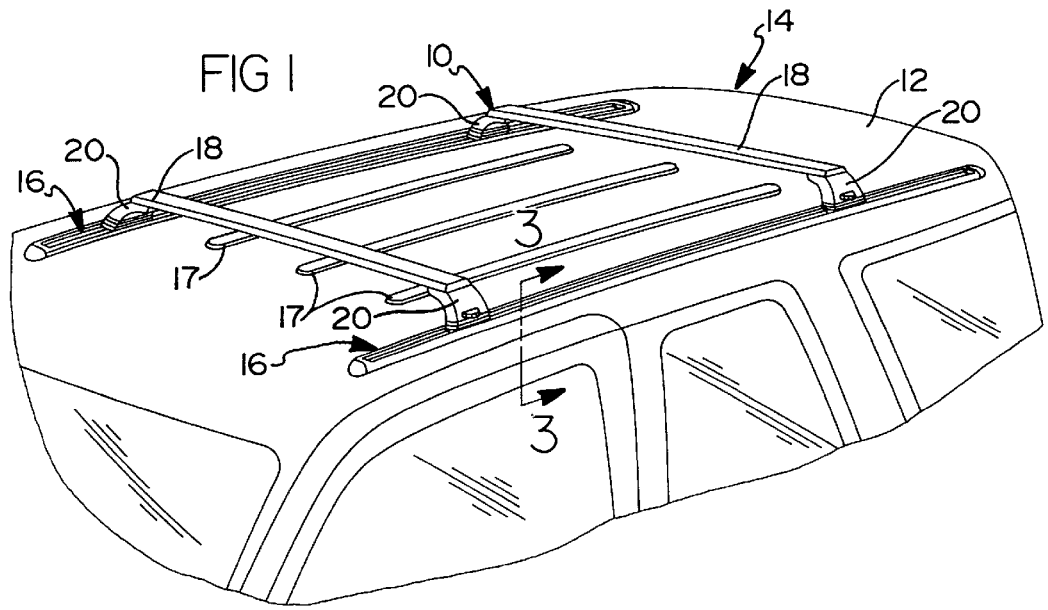
FIG. 1 is a perspective view of a portion of a vehicle showing a typical vehicle article carrier secured thereto.
Figure 3:
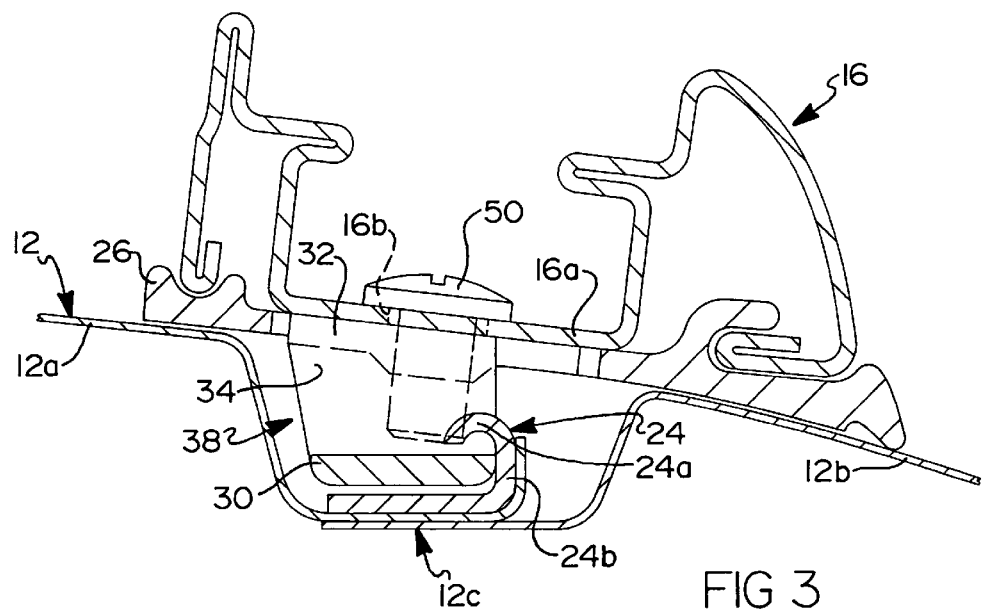
FIG. 3 is a perspective view of a preferred embodiment of the mounting apparatus of the present invention.

Referring to FIG. 1, there is shown a vehicle article carrier 10 installed on an outer body surface 12 of a vehicle 14. The vehicle article carrier 10 generally comprises a pair of longitudinally extending slats 16 spaced apart from one another which are secured fixedly to the outer body surface 12. A pair of crossbars 18 are disposed on the slats 16. The crossbars 18 are supported on the slat 15 by bracket numbers 20. In most applications, at least one of the pairs of bracket numbers 20 is slidably positionable along the slat 16 to enable the spacing of the crossbars 18 to be adjusted as needed to support variously sized articles thereon. It will be appreciated that the above given description of a typical vehicle article carrier system has been provided only for illustrative purposes to illustrate one form of article carrier systems which the apparatus of the present invention is used. The apparatus of the present invention is not limited to article carrier systems including crossbars or slidably adjustable bracket numbers but rather may be used with any article carrier system which requires at least one slat or slat-like element which is fixably secured to the outer body surface of the vehicle.

Referring to FIG. 2, the outer body surface includes a channel 22 which is formed during manufacture of the vehicle. The channel is formed where a roof panel 12a meets a side panel 12b. These two panels are typically spot welded together in the area noted by reference numeral 12c. During manufacture, many vehicle manufacturers are now welding a sturdy hook portion 24 in the channel 22. The portion 24 includes a lip 24a and provides a very sturdy point of attachment to the outer body surface 12. This area of the vehicle 14 is also an extremely strong structural point and more so than the inward areas of the vehicle 14. The specific style of slat 16 shown in FIG. 2 is for exemplary purposes only. Accordingly, it will be appreciated that the cross sectional shape of the slat may vary significantly from that shown in FIG. 2. It is only important that the slat 16 include a wall portion 16a having openings 16b through which conventional fastening elements may be inserted to enable the slat 16 to be secured to the outer body surface 12. In most applications, it is anticipated that a resilient mounting pad 26 will be used in a manner such that it is sandwiched between the slat 16 and the outer body surface 12 to help prevent water and snow from accumulating in the channel 22. The resilient mounting pad 26 is typically formed from rubber, but may be formed from any material which is resilient and allows a good seal to be formed between the slat 16 and the outer body surface 12.

Referring now to FIGS. 3–6, a mounting apparatus 28 in accordance with the preferred embodiment of the present invention is shown. With specific reference to FIGS. 4 and 5, the apparatus 28 includes a base portion 30 having a pair of arm portions 32 at opposite ends thereof. The arm portions 32 are laterally offset from the base portion 30 by a pair of connecting portions 34. The arm portions 32, connecting portions 34 and base portion 30 are all integrally formed from a single piece of material, and preferably from a piece of steel.

With specific reference to FIG. 4, the base portion has a width 36 sufficient to permit the apparatus to be slidably inserted under the lip 24a shown in FIG. 2 to permit the base portion 30 to sit generally flush against a leg 24b of the hook portion 24. In FIG. 6, the thickness of the base portion 30, denoted by arrows 38, is such as to allow the base portion 30 to be partially slid underneath the lip 24a.

With further reference to FIGS. 4 and 5, the arm portions each include openings 40 which are typically drilled and tapped to provide threaded openings by which conventional external fastening elements can be used to secure the slat 16 through the apparatus 28. With specific reference to FIG. 5, it will be noted that each opening 30 is a "volcano" threaded opening, which is well known in the art, and which provides for an increased number of threads to be formed, thereby further strengthening the attachment of the slat 16 to the apparatus 28.

Referring further to FIGS. 4 and 5, the connecting portions 34 are preferably separated by a distance denoted by dimensional arrow 42 which is preferably just slightly larger than the width of the lip 24a. Thus, when the base portion 30 is slid under the lip 24a, the connecting portions 34 prevent the apparatus 28 from sliding longitudinally within the channel 22. The connecting portions 34 also serve to offset the arm portions 32 vertically from the base portion 30 by distance denoted dimensional arrow 44. Distance 44 is such as to place upper surfaces 32a of the arm portions 32 approximately at or slightly above the outer body surface 12. It will be appreciated, however, that this spacing will be determined in part by the specific construction of the slat 16 and the thickness of the mounting pad 26, if such a mounting pad is used. Whether or not the mounting pad 26 is used, however, the apparatus 28 provides the advantage of maintaining a relatively low aerodynamic profile for the slat relative to the outer body surface. With specific reference to FIG. 6, the arm portions 32 are preferably formed so as to extend slightly non-parallel to the base portion 30. This allows the upper surfaces 32a of the arm portions to be presented generally planar with the wall portion 16a of the slat 16 and to therefore compensate or accommodate the slight slope at which the slant is disposed relative to the leg 24b of the hook 24. This angle is denoted by arrow 46 and preferably comprises a range between about 0°–10° and more preferably about 4°. When the arm portions 32 are formed at the angle indicated by reference numeral 46, it will be appreciated that it is desirable to form the connecting portions 34 such that these portions do not interfere with the interior of the channel 22. Accordingly, typically the edges along one side of the connecting portions 34 are preferably formed at an angle typically between about 10°–15°, and more preferably about 12° such that no interference occurs with the interior surfaces of the channel 22.

During installation of the article carrier 10, typically at least a pair of mounting apparatuses 28 are disposed in the channel 22 and are spaced apart from one another. The base portion 30 of each apparatus 28 is slid under the lip 24a of its associated hook portion 24. If a mounting pad 26 is being used, the mounting pad is then positioned over the channel 22 and then the slat 16 is positioned on top of the mounting pad 26. Conventional threaded fasteners 50 shown in FIG. 2 are then threadably advanced through the openings 40. This serves to securely clamp the slat 16 to the outer body surface 12. Thus, there is no need for drilling any holes in the outer body surface 12 or for the use of any conventional riv-nut fasteners. As such, the risk of water entering the interior area of the vehicle is completely or substantially eliminated. Additionally, the risk of drilling one or more holes slightly out of alignment with those preformed in the wall 16a of the slat 16 is also eliminated. The only prerequisite is that the openings 16b in the wall 16a of the slat 16 be formed such that they are spaced apart in accordance with the spacing of the openings 40 of the apparatus 28.

The apparatus 28 of the present invention therefore significantly reduces the cost of assembling a vehicle article carrier to an outer body surface of a vehicle. The apparatus 28 further forms an extremely low cost, structurally strong and reliable means for securing the slats of virtually any form of vehicle article carrier to an outer body surface of a vehicle with little or no modification to the slats.

What is claimed is:

1. A mounting apparatus for mounting a slat of a vehicle article carrier to an outer body surface of a vehicle wherein said apparatus is adapted to be disposed within a channel formed in said outer body surface, and wherein said channel includes at least one hook portion residing therein, said apparatus comprising:
   a mounting bracket including:
      a base portion intermediate a pair of integrally formed arm portions laterally offset from said base portion;
      said base portion having a width enabling it to reside within said channel and a thickness enabling it to slide under said hook portion and to be retained thereby within said channel; and
      said arm portions further having openings permitting fastening elements to be used to secure said slat to said arm portions to thereby clamp said slat against said outer body surface without requiring mounting holes to be drilled or formed in said outer body surface.

2. The apparatus of claim 1, wherein said openings in said arm portions of said apparatus each comprised of threaded openings for receiving said fastening elements.

3. The apparatus of claim 1, wherein each of said arm portions are laterally offset from said base portion by a distance sufficient to place an upper surface of each said arm portion substantially co-planar with said outer body surface.

4. The apparatus of claim 1, wherein said base portion and said arm portions each have a width sufficient to permit said apparatus to be completely disposed within said channel and said outer body surface.

5. The apparatus of claim 1, wherein said arm portions are formed so as to be non-parallel to said base portion.

6. The apparatus of claim 1, wherein each of said openings in said arm portions include a volcano threaded opening.

7. A mounting apparatus for mounting a slat of a vehicle article carrier to an outer body surface of a vehicle, wherein said apparatus is adapted to be disposed within a channel formed in said outer body surface such that said slat is able to be mounted generally flush against said outer body surface, and wherein said channel includes at least one hook portion residing therein, said apparatus comprising:
   a mounting bracket including:
      a base portion;
      a pair of arm portions extending from opposite ends of said base portion;
      said arm portions further being laterally offset from said base portion;
      said base portion further having a width enabling it to reside within said channel and a thickness enabling it to slide under said hook portion to be retained thereby within said channel;
      said arm portions further including connecting portions spaced apart from one another a distance sufficient to allow a lip of said hook portion to extend therebetween to thereby prevent said apparatus from moving longitudinally within said channel; and
      each of said arm portions further including an opening for permitting an associated fastening element to be used to secure said slat thereto in such a manner that said slat is clamped against an outer body surface of said vehicle.

8. The apparatus of claim 7, wherein said arm portions are offset laterally a distance sufficient to permit an upper surface of each said arm portion to be disposed generally co-planar with said outer body surface of said vehicle.

9. The apparatus of claim 7, wherein said arm portions and said base portion each have a width permitting said apparatus to be disposed substantially entirely within said channel.

10. The apparatus of claim 7, wherein each of said openings comprises a volcano threaded opening.

11. The apparatus of claim 7, wherein said arm portions are formed so as to be non-parallel with said base portion.

12. The apparatus of claim 7, wherein an upper surface of each of said arm portions extends at an angle of between approximately 0°–10° from said base portion.

13. The apparatus of claim 7, wherein said upper surfaces of said arm portions extend at an angle of approximately 4° from said base portion.

14. The apparatus of claim 7, further comprising a resilient mounting pad disposed in between said outer body surface and said slat.

15. A mounting apparatus for mounting a slat of a vehicle article carrier to an outer body surface of a vehicle, wherein said apparatus is adapted to be disposed within a channel formed in said outer body surface, and wherein said channel includes at least one permanently secured hook portion residing therein, said apparatus comprising:
   a mounting bracket including:
      a base portion;
      a pair of integrally formed and spaced apart arm portions, said arm portions being laterally offset from said base portion by a pair of connecting portions integrally formed said base portion and said arm portions;
      said base portion having a width sufficiently narrow to permit it to be placed within said channel and slid at least partially underneath a lip of said hook portion to thereby be retained within said channel;
      said connecting portions further being spaced apart a distance just slightly greater than the width of said portion such that said connecting portions prevents that apparatus from being moved slidably longitudinally within said channel;
      each said arm portion further including a threaded opening for receiving a respective fastening element used for fastening said slat thereto;
      wherein said arm portions and said base portion have widths sufficiently narrow to permit substantially said entire apparatus to be disposed within said channel to thereby permit said slat to be mounted substantially flush against said outer body surface.

16. The apparatus of claim 15, wherein each of said arm portions include an upper surface,
   wherein said upper surfaces are substantially co-planar with said outer body vehicle surface.

17. The apparatus of claim 15, wherein said arm portions are formed so as to extend generally non-planar to said base portion.

18. The apparatus of claim 17, wherein said arm portions are formed to extend at an angle of between about 0°–10° relative to said base portion.

19. The apparatus of claim 18, wherein said angle comprises an angle of about 4°.

20. The apparatus of claim 15, further comprising a resilient mounting pad adapted to be disposed said slat and said outer body surface of said vehicle.

* * * * *